United States Patent
Pospiech et al.

(10) Patent No.: US 10,254,526 B2
(45) Date of Patent: Apr. 9, 2019

(54) MICROSCOPE

(71) Applicant: Carl Zeiss Microscopy GmbH, Jena (DE)

(72) Inventors: Matthias Pospiech, Hannover (DE); Steffen Leidenbach, Gleichen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 188 days.

(21) Appl. No.: 15/279,060

(22) Filed: Sep. 28, 2016

(65) Prior Publication Data

US 2017/0090176 A1    Mar. 30, 2017

(30) Foreign Application Priority Data

Sep. 29, 2015 (DE) .................. 10 2015 116 452

(51) Int. Cl.
| | |
|---|---|
| G02B 21/24 | (2006.01) |
| G02B 21/06 | (2006.01) |
| G02B 21/00 | (2006.01) |
| G02B 21/08 | (2006.01) |
| G02B 5/00 | (2006.01) |

(Continued)

(52) U.S. Cl.
CPC ....... *G02B 21/245* (2013.01); *G02B 21/0088* (2013.01); *G02B 21/06* (2013.01); *G02B 21/082* (2013.01); *G02B 5/005* (2013.01); *G02B 21/34* (2013.01); *G02B 21/361* (2013.01)

(58) Field of Classification Search
None
See application file for complete search history.

(56) References Cited

U.S. PATENT DOCUMENTS

| | | |
|---|---|---|
| 4,516,840 A | 5/1985 | Nakahashi et al. |
| 5,604,344 A | 2/1997 | Finarov |
| (Continued) | | |

FOREIGN PATENT DOCUMENTS

| | | |
|---|---|---|
| DE | 10153113 A1 | 3/2003 |
| DE | 10362244 B4 | 6/2014 |
| (Continued) | | |

OTHER PUBLICATIONS

Matthias Pospiech, Beamforming in femtosecond laser microstructuring, English translation of thesis accepted by the Faculty of Mathematics and Physics Gottfried Wilhelm Leibniz University Hannover, 2011, 9 pages.

*Primary Examiner* — Heather R Jones
(74) *Attorney, Agent, or Firm* — Skaar Ulbrich Macari, P.A.

(57) ABSTRACT

A microscope is provided with a holder for holding a sample carrier, an imaging unit which comprises a first detector and a first imaging optical system for imaging at least one part of a sample held by the sample carrier along a first optical axis onto the first detector, a control unit and a detection unit which comprises an illuminating module, a second detector and a second imaging optical system. The control unit only analyzes the measured values originating from the analysis area by the second detector in order to determine the direction of the change of position of the focus of the first imaging optical system along the first optical axis with the aim of positioning the boundary surface of the sample carrier directed towards the sample side in the depth of field area of the first imaging optical system.

19 Claims, 7 Drawing Sheets

(51) Int. Cl.
    *G02B 21/34*     (2006.01)
    *G02B 21/36*     (2006.01)

(56)     References Cited

U.S. PATENT DOCUMENTS

| | | |
|---|---|---|
| 2004/0065825 A1* | 4/2004 | Asaki .................... H01J 37/28 |
| | | 250/310 |
| 2004/0113043 A1* | 6/2004 | Ishikawa .............. G02B 21/245 |
| | | 250/201.4 |
| 2006/0017001 A1 | 1/2006 | Donders et al. |
| 2007/0152130 A1 | 7/2007 | Fomitchov |
| 2008/0240528 A1 | 10/2008 | Tumpner |
| 2010/0033811 A1 | 2/2010 | Westphal et al. |

FOREIGN PATENT DOCUMENTS

| | | | |
|---|---|---|---|
| EP | 0089804 A1 | 9/1983 | |
| JP | 2011257661 A | 12/2011 | |
| JP | 5570879 B2 | 8/2014 | |

\* cited by examiner

MICROSCOPE

PRIORITY

This application claims the benefit of German Patent Application No. 102015116452.3, filed on Sep. 29, 2015, which is hereby incorporated herein by reference in its entirety.

FIELD

The present invention relates to a microscope with a holder for holding a sample carrier, an imaging unit, which comprises a first detector and a first imaging optical system for imaging at least one part of a sample held by the sample carrier along a first optical axis on the first detector, and a control unit. Further, the present invention relates to a corresponding microscopy method.

BACKGROUND

Since, as a rule, the distance between the sample carrier and the first imaging optical system is not known after the insertion of the sample carrier with a new sample to be examined, this distance must first of all be changed, e.g. in the case of fully-automated image capture processes, such that the sample lies in the depth of field area of the first imaging optical system. Then the fully-automated image capture process can be carried out.

SUMMARY

The object of the present invention is therefore to further develop a microscope of the type mentioned at the beginning in such a way that the sample held by the sample carrier can be positioned reliably in the depth of field area of the first imaging optical system.

The object is achieved according to the invention in the case of a microscope of the type mentioned at the beginning in that a detection unit is provided with an illuminating module, a second detector and a second imaging optical system, wherein the illuminating module illuminates a sample carrier which is held by the holder with a predetermined pattern that is imaged by means of the second imaging optical system onto the second detector, wherein the second detector is masked in such a way that a detection area of the second detector which the pattern occupies during focused imaging, or a part of the detection area is defined as analysis area, and wherein the control unit only analyzes the measured values originating from the analysis area by the second detector in order to determine the direction of the change of position of the focus of the first imaging optical system along the first optical axis with the aim of getting the boundary surface of the sample carrier directed towards the sample side in the depth of field area of the first imaging optical system.

By defining the analysis area, the direction of the change of the position of the focus of the first imaging optical system along the first optical axis can be easily and reliably determined, e.g. by analyzing the total intensity from the analysis area, for example, for at least two different focal positions of the second imaging optical system. Thus, the greater the total intensity from the analysis area becomes, the closer the focus of the second imaging optical system lies to a boundary surface of the sample carrier. With the microscope according to the invention, the reflecting property of the boundary surface of the sample carrier is thus utilized in order to locate its position along the first optical axis. It can also be said that the position of the focus of the first imaging optical system is determined with respect to a boundary surface of the sample carrier. This is understood to mean in particular whether the sample carrier is located above or below the current focal position of the first imaging optical system. From this knowledge, the direction of the focus correction can thus be inferred. The determined position can thus be utilized to change the distance between the first imaging optical system and the sample carrier in such a way that the boundary surface of the sample carrier directed towards the sample side and thus the sample carried by the sample carrier is positioned in the depth of field area of the first imaging optical system.

In particular, the boundary surface of the sample carrier facing the first imaging optical system can be found with the microscope according to the invention. Thus, for example, with knowledge of the thickness of the sample carrier, the boundary surface of the sample carrier facing away from the first imaging optical system can be approached. Alternatively, it is possible with the microscope according to the invention to locate the boundary surface of the sample carrier facing away from the first imaging optical system directly. If the upper boundary surface is then approached such that the focus of the first imaging optical system lies directly on the upper boundary surface, the sample carried on the sample carrier, which is located directly on the upper boundary surface, is located in the depth of field of the first imaging optical system. Moreover, in an advantageous manner, after the determination of the position of at least one boundary surface of the sample carrier, the position thus determined can be utilized for known autofocus processes in order to carry out a focus stabilization via the reflection at such a boundary surface.

With the microscope according to the invention, a reflecting surface (or the position thereof) can thus be determined.

If the sample is held by the sample carrier on its boundary surface, the sample can be quickly positioned in the depth of field area of the first imaging optical system. Even if the sample is spaced apart from the boundary surface directed towards the sample side, it is possible to position it quickly in the depth of field area of the first imaging optical system. Thus, the sample distance can be so small that it is not larger than the depth of field area. In this case, positioning the boundary surface directed towards the sample side in the depth of field area of the first imaging optical system already leads to the sample also being positioned in the depth of field area (or very close thereto). If the sample distance from the boundary surface directed towards the sample side is larger than the depth of field area, positioning the boundary surface directed towards the sample side in the depth of field area of the first imaging optical system leads to only a small refocusing (compared with the case in which the boundary surface is not first positioned in the depth of field area) being necessary in order to position the sample in the depth of field area.

In particular, according to the invention, the boundary surface of the sample carrier and/or the boundary surface of the sample which is carried by the sample carrier can be positioned relative to the first imaging optical system such that this boundary surface lies in the depth of field area of the first imaging optical system.

By imaging the pattern on the second detector by means of the second imaging optical system is meant in particular here that the reflection of the pattern at least at one boundary surface of the sample carrier is imaged onto the second detector.

The microscope according to the invention can in particular carry out a magnifying imaging by means of the first imaging optical system.

Since the detection unit comprises the second detector, which is not the first detector of the imaging unit, the captures can be carried out by means of the first detector independently of the determination of the position of the sample carrier boundary surface by means of the detection unit. This leads to a gain in speed in the processing of data for determining the position of the sample carrier boundary surface and in image acquisition since parallel processing is possible.

In particular, the illumination of the sample carrier with the predetermined pattern can be carried out over at least part of the first imaging optical system.

In the microscope according to the invention, the control unit can actuate or control the detection unit and/or the holder in such a way that the predetermined pattern is imaged onto the second detector at two different focal positions of the second imaging optical system, wherein the control unit determines on the basis of the measured values in which direction the focal position is to be shifted in order to be able to determine the position of the boundary surface of the sample carrier. The different focal positions can be set e.g. by shifting a lens (or objective) of the detection unit (the detection unit and the imaging unit can comprise the same lens or objective) and/or the holder along the imaging direction. In addition or alternatively it is possible to shift the second detector along the imaging direction.

Further, the detection unit can comprise at least two second detectors, the optical distance of which from the holder in the imaging direction is different, with the result that the predetermined pattern can be captured simultaneously in different focal positions. Thus, with only a single capture process, in which the relative position between the holder and the detection unit remains unchanged, it is possible to determine the direction in which the focal position is to be shifted in order to carry out the desired positioning of the boundary surface of the sample carrier directed towards the sample side in the depth of field area of the first imaging optical system.

In particular, the change of the focal position to capture the predetermined pattern with the detection unit can be chosen to be smaller as the distance from the target state decreases and larger as the distance increases. The step size is thus adapted dynamically to the increase in signal. For instance, large steps in the case of a large distance and smaller steps on approaching the target state. A high speed and a high accuracy can thereby be achieved in the positioning of the boundary surface of the sample carrier in the depth of field area of the first imaging optical system.

Further, the illuminating module can be formed such that the predetermined pattern, with which the sample carrier is illuminated, comprises two partial patterns spaced apart laterally from each other which illuminate the sample carrier at different focal positions. By this is meant in particular that both partial patterns are present in the area of the sample carrier in the case of illumination. The illuminating module can direct a pattern onto the sample carrier for illumination (e.g. imaging), such that the stated illumination state is achieved. The pattern is multiplied by the illuminating module and the sample carrier is illuminated with the multiplied pattern at different focal positions. It is also possible to provide the pattern with the partial patterns already such that the illuminating module directs or images the partial patterns for illumination onto the sample carrier. In this case too it is possible with only a single capture process to infer the direction in which the focal position is to be shifted in order to carry out the desired positioning of the boundary surface of the sample carrier in the depth of field area of the first imaging optical system.

Of course, the illuminating module can illuminate the sample carrier with the predetermined pattern such that more than two partial patterns which are spaced apart laterally from each other are provided, which each illuminate the sample carrier at different focal positions.

The at least two partial patterns can have the same shape or also different shapes.

The second detector can be formed e.g. as a line sensor or as a two-dimensional detector which is aligned parallel to a plane in which the predetermined pattern is imaged. However, it is also possible for the second detector to be formed as a two-dimensional detector and to be arranged tilted with respect to a plane in which the predetermined pattern is imaged. Through this tilted arrangement, information from different focal positions can be obtained simultaneously with one capture. This can be advantageous if the capture is carried out with a focal position which has a relatively large distance from the desired depth of field area of the first imaging optical system. It is further possible to divide the analysis area into a first and second partial area in order thus to obtain measured values from different focal positions because of the inclination. It is thereby possible, for example, with only a single capture, to infer the direction in which the focal position is to be shifted in order to carry out the desired positioning of the boundary surface of the sample carrier directed towards the sample side in the depth of field area of the first imaging optical system.

Further, the illuminating module can comprise two second detectors, wherein a first of the second detectors is tilted with respect to a plane in which the predetermined pattern is imaged and a second of the second detectors is arranged parallel to the plane in which the predetermined pattern is imaged. This can in particular be used in order to determine, with the tilted second detector, the direction for shifting the focal position from large distances from the sample carrier boundary surface and, with the non-tilted second detector, the direction for shifting the focal position from smaller distances from the sample carrier boundary surface. The non-tilted second detector supplies more precise information about the direction from short distances and, in the vicinity of the maximum (reflection in the depth of field of the first imaging optical system), the position of the boundary surface can be determined much more precisely than with the tilted second detector. Thus, in comparison with conventional processes, a greater coverage and a higher resolution can be achieved.

The shape of the predetermined pattern with which the sample carrier is illuminated can in principle be any desired shape. The pattern can, in particular, be formed as a polygon (e.g. square or rectangle), as a circle or ellipse. However, it is also possible for the predetermined pattern to be formed e.g. as a line (straight or curved), as a wavy line or otherwise. Further, the predetermined pattern, with which the sample carrier is illuminated, can comprise several partial patterns spaced apart from each other laterally which can be imaged in the same and at different focal positions. The partial patterns can have the same or different shapes. As already described, it is also possible for the illuminating module to multiply a pattern during illumination of the sample carrier such that only the illuminated pattern (which is present in the area of the sample carrier) comprises the several partial patterns.

The second detector can comprise at least one light diode. In particular, the definition of the analysis area can be realized by the arrangement of one or more light diodes and/or by providing a mechanical diaphragm.

The illuminating module can comprise an illuminating light source, which is formed e.g. as a laser, halogen light source, etc.

The illuminating module can, for the generation of the predetermined pattern with which the sample carrier is illuminated, comprise a diaphragm and/or a two-dimensional light modulator (such as e.g. an LCD module or a tilting mirror matrix). Further, it is possible for the illuminating module to comprise a diffractive phase mask and optionally a module for amplitude modulation. A generated pattern, which is present e.g. in the shape of a circle, can thus be imaged onto the sample carrier such that it is present many times in the illuminated pattern (preferably at different focal positions).

The separation between the light of the illuminating module and the light for imaging the sample on the first detector can be carried out e.g. via the wavelength. However, any other type of separation is possible, thus, e.g., the polarization state can be utilized for the separation.

In the microscope according to the invention, the second detector can be formed as a two-dimensional detector which is selectively aligned parallel to the plane in which the predetermined pattern is imaged and can be aligned tilted with respect to this plane. If the second detector is formed as a line detector, this can be provided such that it is selectively positioned in an imaginary reference plane which is parallel to the plane in which the predetermined pattern is imaged or is positioned tilted with respect to the reference plane.

With the microscope according to the invention, in particular a fully-automated image capture process is possible in which first of all the sample is positioned in the depth of field area of the first imaging optical system and then the desired captures are generated.

A microscopy method is further provided for a microscope with a holder for holding a sample carrier, an imaging unit which comprises a first detector and a first imaging optical system for imaging (in particular for magnified imaging) at least a part of a sample held by the sample carrier along a first optical axis on the first detector, and a detection unit which comprises an illuminating module, a second detector and a second imaging optical system, wherein the illuminating module illuminates a sample carrier which is held by the holder with a predetermined pattern that is imaged by means of the second imaging optical system onto the second detector, wherein the second detector is masked in such a way that a detection area of the second detector which the pattern occupies during focused imaging, or a part of the detection area is defined as analysis area, and wherein the second detector only analyzes the measured values originating from the analysis area in order to determine the direction of the change of position of the focus of the first imaging optical system along the first optical axis with the aim of getting the boundary surface of the sample carrier directed towards the sample side in the depth of field area of the first imaging optical system.

The microscopy method according to the invention can be further developed as is described in connection with the microscope according to the invention (including further developments thereof). Further, the microscope according to the invention can be further developed such that the microscopy method according to the invention (including further developments thereof) can be carried out.

It is understood that the features named above and those yet to be explained below can be used not only in the stated combinations but also in other combinations or alone without departing from the scope of the present invention.

Figure 1:
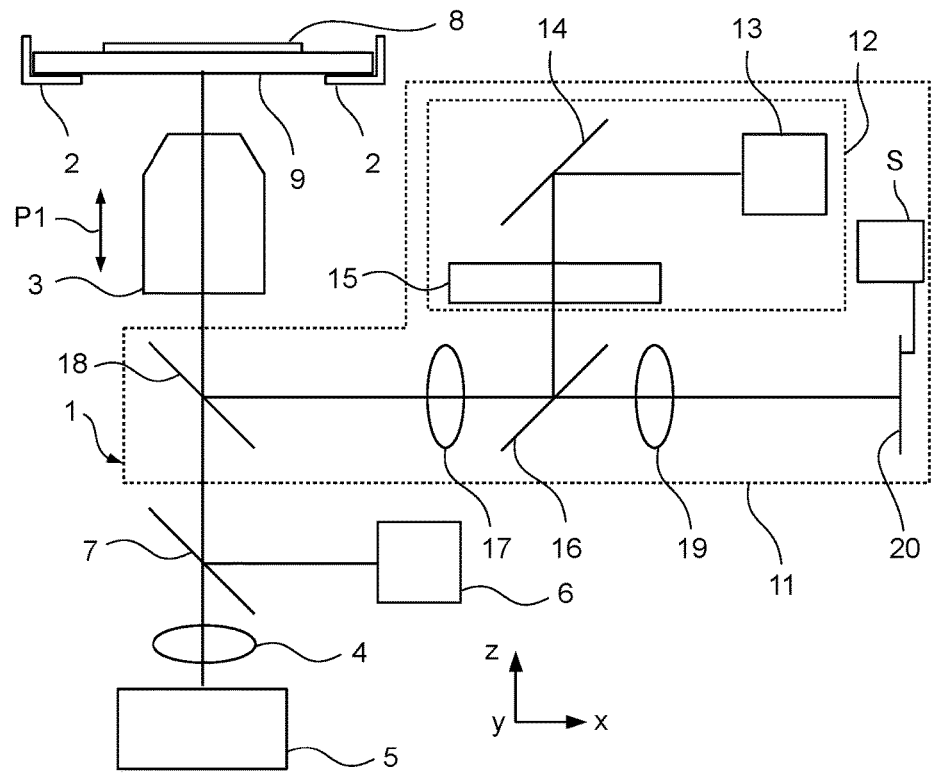
FIG. 1 is a schematic representation of a first embodiment of the microscope according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the microscope 1 according to the invention comprises a holder 2, a lens 3, a first partial optical system 4 (e.g. a tube optical system) and a camera 5. Furthermore, the microscope 1 comprises a first light source 6, the illumination light of which can be coupled into the imaging beam path via a partially transparent mirror 7 arranged between the lens 3 and the first partial optical system 4 and thus directed via the lens 3 onto a sample 8 which is held in the holder 2. The sample 8 can, for example, be arranged on a sample carrier or a cover glass 9 which is held in the holder 2, as can be seen in particular in the enlarged detailed representation in FIG. 2. An immersion medium 10 (such as e.g. water, oil or glycerol) can be provided between the lens 3 and the cover glass 9. Alternatively, the immersion medium 10 can also be omitted. In this case, air is located between the lens 3 and the cover glass 9 for example.

The sample 8 illuminated with the light of the light source 6 is imaged magnified onto the camera 5 in a known manner via the lens 3 and the first partial optical system 4. In order to realize a sharp imaging, the lens 3 can be moved along the z-direction, for example, as is indicated by the double arrow P1 in FIGS. 1 and 2. The focal position of the focal plane F of the lens 3 represented schematically in FIG. 2 or the corresponding imaging on the camera 5 can thereby be shifted in the z-direction such that it coincides with the sample 8 to be imaged. By the presence of a target state is meant here in particular that the focal plane F lies such that a boundary surface of the cover glass 9 lies in the depth of field area of the lens 3. This can be the immersion boundary surface or the sample boundary surface. If the boundary surface (immersion boundary surface) remote from the sample 8 is found, via a renewed search for the sample boundary surface, the latter can be found. Alternatively, with the knowledge of the thickness of the cover glass, the difference can be determined with which the focus drive needs to be moved. In both cases, the sample 8 which is located on the sample carrier boundary surface is brought into the depth of field of the imaging optical system. A deviation is labelled as displacement ΔF or focus shift ΔF and is drawn in relative to the boundary surface immersion medium 10 and cover glass 9 in FIG. 2. The correction to achieve the target state is referred to as focus adjustment or focus correction. The direction of the focus shift ΔF is along the direction of movement of the lens 3, which is here labelled as z-axis. Of course, the microscope 1 can also be formed such that the holder 2 can be moved in the z-direction for focusing. This can take place in addition to or as an alternative to the movement of the lens 3.

Since, after the insertion of the cover glass 9 with the sample 8 in the holder 2, the lens 3 is located at an unknown distance from the cover glass 9 and thus from the sample 8, it is desirable if it is possible to reliably and preferably automatically minimize this distance (in particular the achievement of the desired target state). In this case, e.g. an automated image capture process (with, for example, focusing of the sample 8 and capture of the sample 8) can follow, with the result that, after the insertion of the cover glass 9 with the sample 8, an automated capture process can be realized.

Figure 3:
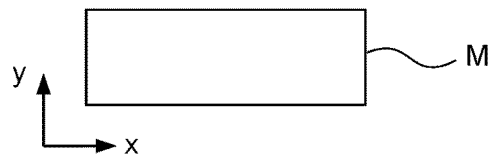
FIG. 3 is a schematic representation of the predetermined illumination pattern with which the sample is illuminated.

The microscope 1 according to the invention comprises a detection unit 11. The detection unit 11 comprises an illuminating module 12 with a second light source 13, a deflecting mirror 14 and a light modulator 15. The illuminating module 12 is formed such that the illumination of the cover glass 9 can take place with a predetermined pattern. For example, a rectangular illumination pattern M is generated, which is shown schematically in FIG. 3. For this, the light modulator 15 can be formed e.g. as a diaphragm. The illumination pattern M is coupled into the imaging beam path of the microscope 1 via a partially transparent mirror 16, a second partial optical system 17 and a color splitter 18, with the result that the rectangular pattern M can be imaged onto the cover glass 9 via the lens 3. The desired separation between the illumination light of the first light source 6 and the light for generating the pattern M of the detection unit 11 takes place here via the wavelength. Thus, the first light source 6 can e.g. emit light in the visible wavelength range, whereas the second light source 13 emits light in the infrared range. The light of the detection unit 11 reflected back from the sample 8 and/or the cover glass 9 is imaged onto a detector 20 of the illuminating module 12 via the lens 3, the color splitter 18, the second partial optical system 17, the partially transparent mirror 16 and a third partial optical system 19. The third partial optical system 19 is optional and can e.g. be omitted if the second partial optical system 17 is formed as a tube lens.

Figure 4:
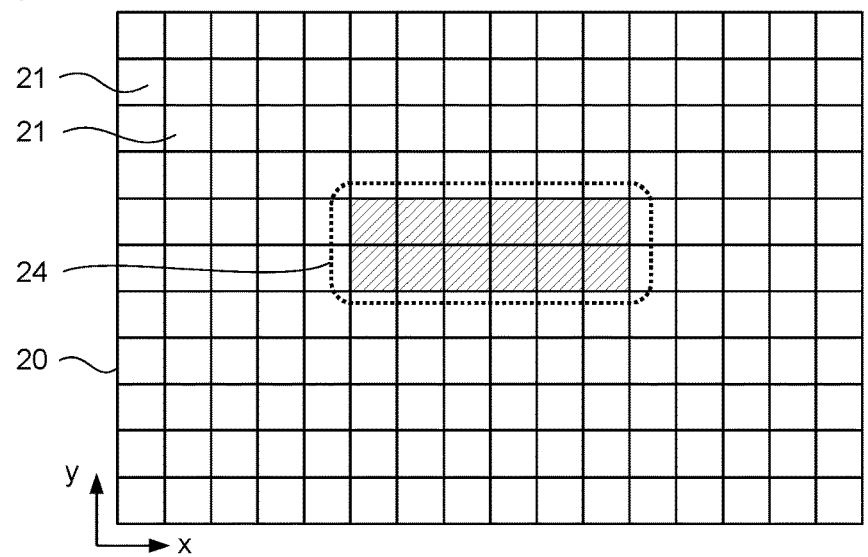
FIG. 4 is a schematic representation of the focused imaging of the illumination pattern on the second detector.

The detector 20 can be formed as a two-dimensional detector with a plurality of individually readable detector pixels 21, which are arranged e.g. in rows and columns, as is shown in FIG. 4. The individual pixels 21 of the detector 20 are drawn in schematically as squares. For improved representation, the representation in FIG. 4 is not true to scale. The representation is to be understood as purely schematic. Assuming that the focal plane F (FIG. 2) coincides with a boundary surface (upper side or underside 22, 23) of the cover glass 9, a sharp imaging is present on the detector 20 because of the reflection of the pattern M at this boundary surface 22, 23. This focused imaging leads to the imaged rectangular illumination pattern occupying the pixels 21 shaded in FIG. 4. These pixels 21 are defined as analysis area 24 and only the signals originating from the pixels 21 from the analysis area 24 are analyzed, as will be described in the following. The analysis can be carried out by a control unit S (FIG. 1). The control unit S can be a component of the microscope 1 and in particular of the detection unit 11 and can also be used to control the microscope 1. However, it is also possible for the analysis to be carried out in an analysis unit (not shown), which is not a component of the microscope 1.

Figure 2:
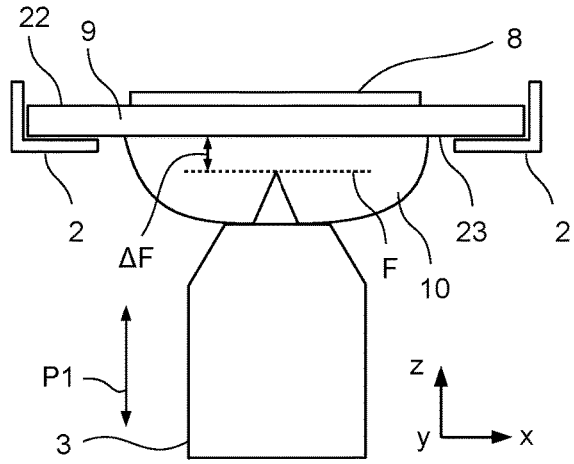
FIG. 2 is an enlarged detailed representation of the holder from FIG. 1.
Figure 5:
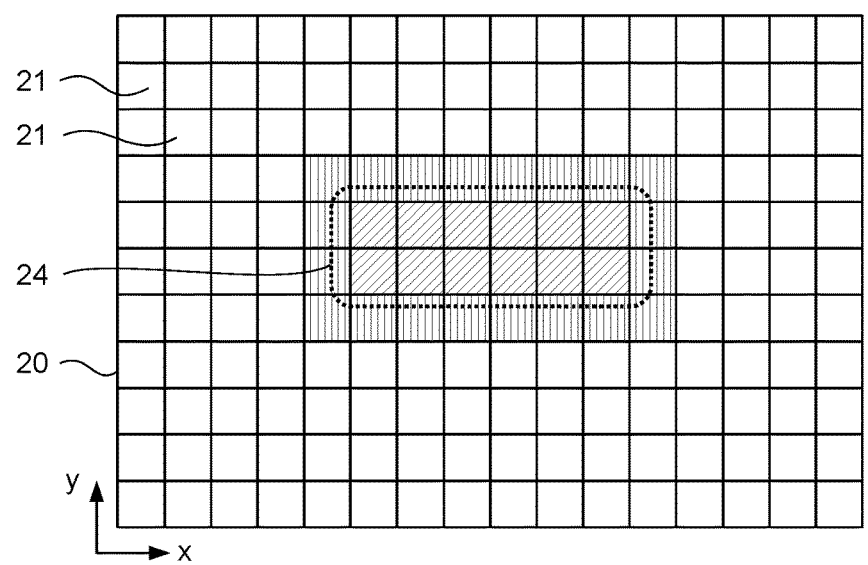
FIG. 5 is a schematic representation of an unfocused imaging of the illumination pattern on the second detector.

If the lens 3 is spaced apart from the sample cover glass 9 as is shown in FIG. 2, the focal plane F does not coincide with the upper side or underside 22, 23 of the cover glass 3, with the result that the reflection of the illumination pattern M on the upper side and/or underside 22, 23 leads to a blurred imaging of the illumination pattern M on the detector 20. This is represented schematically in FIG. 5, wherein the pixels 21 occupied because of the blurred imaging of the rectangular illumination pattern are again represented shaded. A comparison with FIG. 4 shows that pixels outside the analysis area 24 are also illuminated. However, as already described, these are not taken into account in the further analysis. The pixels 21 outside the analysis area 24, which are occupied by the imaged pattern, are shaded vertically whereas the pixels 21 occupied inside the analysis area 24 are shaded diagonally. Only the pixels 21 shaded diagonally are analyzed. Through the definition of the analysis area 24, a diaphragm function is emulated via the reading of the pixels of the detector 20. The analysis area 24 can also be referred to as the region of interest (ROI).

Figure 6:
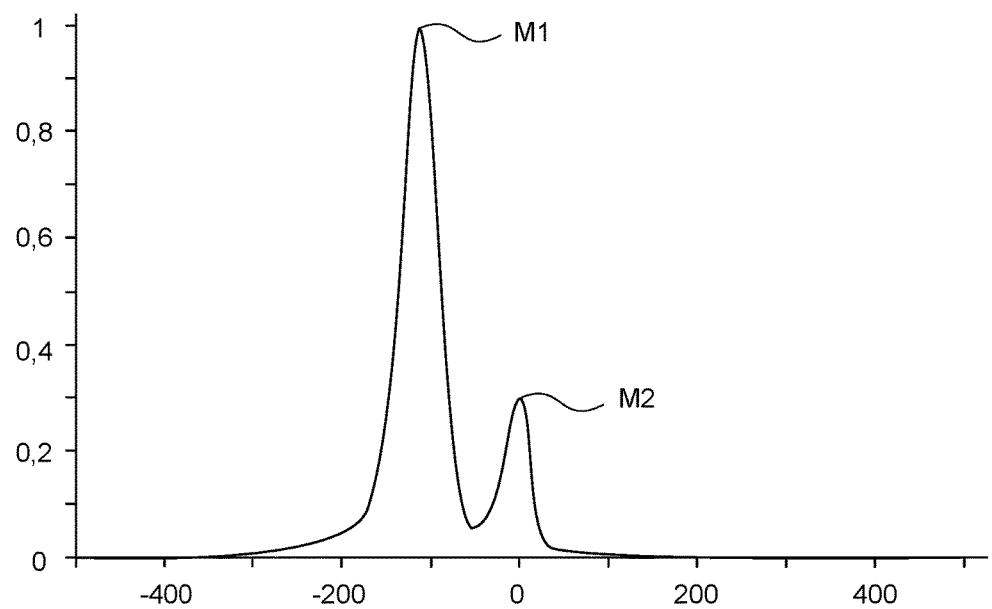
FIG. 6 is a schematic representation of the amount of light from the analysis area of the second detector as a function of the distance of the lens from the sample.

In FIG. 6, the amount of light of the pixels 21 from the analysis area 24 is plotted along the y-axis normalized to 1 as a function of the distance of the lens 3 from the cover glass 9 (along the x-axis in μm). Since only the pixels 21 from the analysis area 24 are analyzed (the intensity of the pixels 21 measured from this is added), there is a maximum M1 where the focal plane F coincides with the underside 23 of the cover glass 9 and a maximum M2 where the focal plane F coincides with the upper side 22 of the cover glass 9. At other focal positions, the imaged pattern M becomes blurred and larger, with the result that the intensity from the analysis area 24 falls, as can be seen in FIG. 6. The representation in FIG. 6 shows a measurement on a cover glass 9 with a thickness of 0.170 mm. Since the refractive index of the cover glass is about 1.5, the distance between the two maxima M1 and M2 is approximately 114 μm.

Since only a single signal is obtained when measuring at a focal position by the detector 20 (a value of the amount of light for a particular z position), as a rule it is not possible to infer from this neither the absolute z position nor the direction in which the distance is to be changed in order e.g. to reduce the distance between the lens 3 and the cover glass 9.

Figure 7:
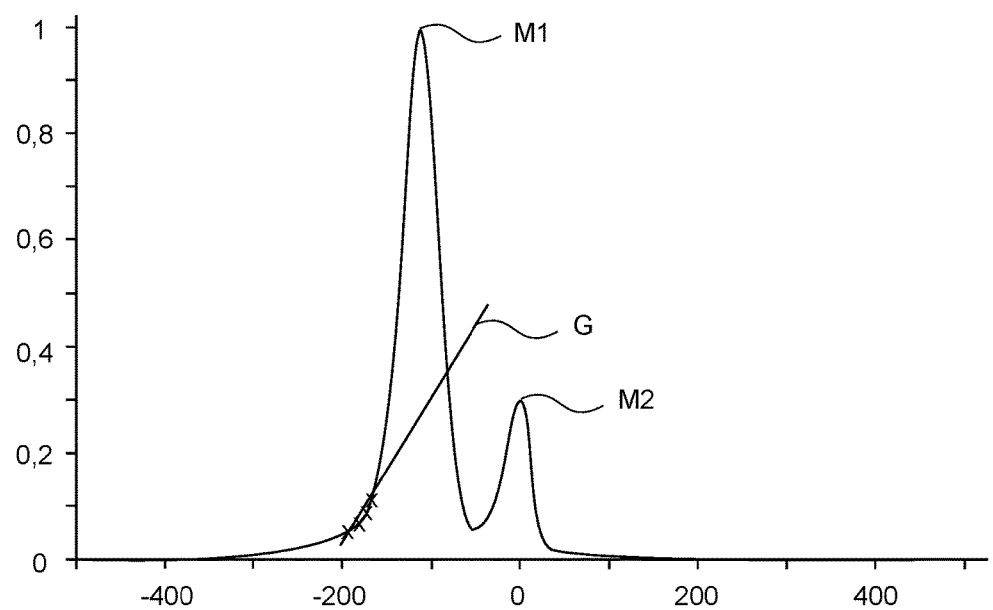
FIG. 7 is a representation according to FIG. 6, wherein four measurement points are drawn in together with a linear best fit line.

For the desired focus correction to achieve the target state, the signals of the pixels from the analysis area 24 for different focal positions can therefore be recorded along the z-axis. In FIG. 7, four measurement points x are drawn in schematically at a distance in each case of 10 μm. From these measurement points x, the gradient can be determined via a linear best fit (in FIG. 7 the corresponding best fit line G is drawn in schematically) and thus in this case a focus adjustment in the positive z-direction.

Achieving the target state can take place in that the z position is approached upwards or downwards in a stepwise manner depending on the intensity data and gradients determined, the direction of the change in intensity is determined again taking into account the new measurement point and the position of the next measurement point is determined therefrom. If iteration is made along the z-axis in this way, a maximum is found which belongs either to the upper side 22 or to the underside 23.

The step size can be chosen on the basis of the gradient in the intensity profile to be expected and on the basis of the lens data, in particular of the magnification. Here, small magnifications show a very weak gradient, while large magnifications have a very steep profile. In addition, the step size can be adapted dynamically to the last measured gradient. In the case of small gradients it is to be expected that the focus error is large, with the result that a large step size is possible. In the case of large gradients, the focus error is possibly very small and thus a small step size is more expedient. Above all, this dynamic adaptation makes it possible to reduce the time taken to achieve the target state since fewer z positions need to be approached. In principle, several situations can be differentiated from which a decision about a direction of the focus correction takes place.

If all of the values show a clear gradient, it is possible to determine the direction clearly and thus without errors. This is the case when the intensity values for successively approached z positions along a direction (either along or against the z-direction) are in each case larger or in each case smaller than the previous value.

If the gradient is clear and positive, a search takes place upwards. If it is clear and negative, a search takes place downwards.

Further, the determined gradient can be so small that it is not possible to rule out a possible incorrect decision. This is e.g. the case when z positions are approached at which the focal position has a large distance from the upper or lower boundary surface 22, 23 of the cover glass 9. Since it cannot be detected whether the focal position lies above or below the cover glass 9, it is preferable (e.g. for safety reasons) to carry out a search downwards. That is to say, if a search is incorrectly made upwards, there is the risk of the lens 3 colliding with the cover glass 9. In contrast, if a search is incorrectly made downwards, the z drive (not shown) of the lens 3 only catches on the lower stop, which can be detected via the software control for moving the lens 3.

With the search downwards it can thus be the case that a boundary surface 22, 23 can be determined. In this case, the focal position lay above the upper side or underside 22, 23 of the cover glass 9.

If, however, the focal position lay below the lower boundary surface 23, the z drive of the lens 3 will run into the lower stop after a certain time. In this case, a search upwards can be carried out since it is now definitely known that the location is below the cover glass 9.

It is also possible to deliberately move the lens 3 into the lowest z position and then carry out an upwards search.

Further, it is possible for the increase not to point clearly upwards or downwards but to have a clearly parabolic profile. This occurs when the focal position lies between the upper side 22 and the underside 23 of the cover glass 9. This is represented schematically in FIG. 8. If the parabola P has an opening towards the top and the minimum of the parabola P is located within the measurement points used for the determination, a minimum would be detected in the intensity profile. A search in both directions is thus possible.

With these decision criteria for the iterative approaching of the target state the latter can be found reliably. According to the invention it is thus possible to arrive at the operating area or depth of field area of the lens 3. A further autofocusing principle can now be used in addition in order to carry out a precise determination and/or stabilization of the focus.

The exposure time on the detector 20 and also the intensity of the second light source 13 of the illuminating module 12 naturally have an upper and a lower limit. In the procedure described here, it is advantageous to operate the second light source 13 at maximum intensity in order to realize exposure times which are as short as possible. If it is established that the detector 20 is over-exposed, the light intensity of the second light source 13 is to be reduced and/or the exposure time of the detector 20 is to be reduced. The intensity measured on the detector 20 thus changes but independently of the z position. The intensity of the detector ($I_{Camera}$) is therefore to be scaled with the exposure time ($t_{Camera}$) and the intensity of the second light source ($I_{Lamp}$) in order to obtain the intensity $I_{Signal}$ of the pixels 21 from the analysis area 24.

$$I_{signal} = \frac{I_{camera}}{I_{lamp} \cdot t_{camera}}$$

In the case of other types of detector (e.g. in the use of photodiodes) analogous corrections may need to be carried out.

As already stated, the z positions for the correction of the focal position and determination of the correction direction are approached in a stepwise manner. The path length or the step size can be adapted to the gradient to be expected because of the lens specifications (magnification). Thus, e.g. a higher step size can be chosen for low magnifications such as 10 or 20 times magnification, a medium step size can be chosen for the area of 40 times magnification and very small step sizes can be chosen for areas with higher magnifications.

To reduce the total steps to the optimal focal position, the step size can be adapted dynamically to the last measured gradient. Thus, in the case of small gradients, larger distances can be covered between two measurement points along the z-axis and in the case of very large gradients, smaller step sizes can be utilized in order to more precisely achieve the target state. In addition, in a downwards search, the step size can be increased if the gradient is detected to be very small since there is no danger of a collision with the cover glass 9.

Figure 8:
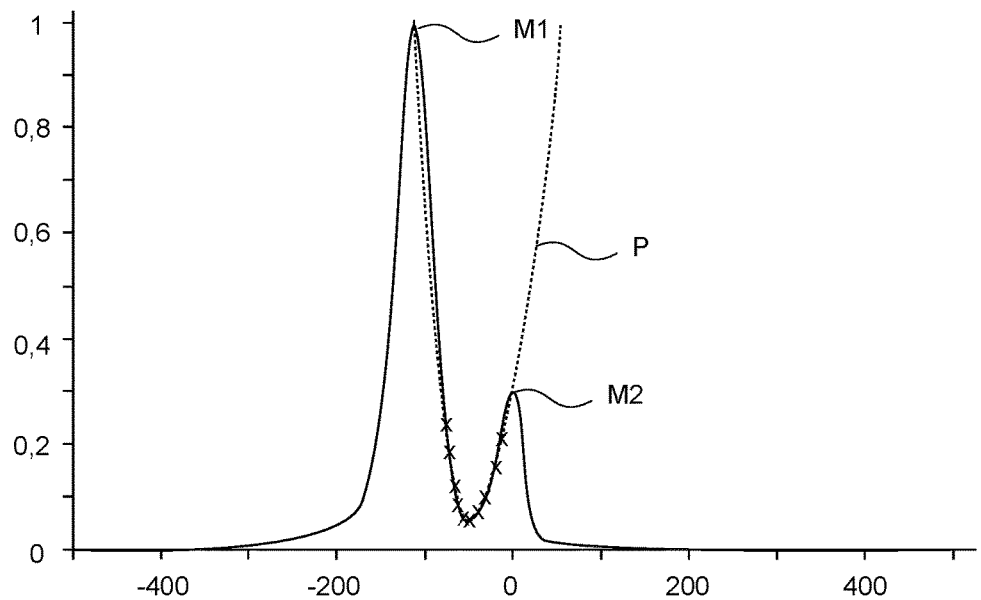
FIG. 8 is a representation according to FIG. 6, wherein several measurement points are drawn in together with a best fit parabola.

As can be seen in FIGS. 6 to 8, there is a very steep curve profile in the vicinity of the target state (maxima M1 and M2). As the distance from the target state increases, the signal becomes decreasingly clear. This can be compensated for e.g. by inclining the detector 20. In the previous embodiment example, the imaging struck the surface spanned by the pixels of the detector perpendicularly. There was thus an angle of the detector 20 relative to the imaging of 0°. If a larger angle is now set by inclining, such as e.g. an angle of 50°, this corresponds to the formation of an average of the intensity values over z. Such a formation of the microscope 1 according to the invention is represented schematically in FIG. 9, wherein the inclined detector is labelled with the reference number 26. In FIG. 10, in the same way as in FIGS. 6 to 8, the intensity profile from the analysis area 24 is plotted as a function of the focal position (z position), wherein the profile for the inclined detector 26 with an angle of 50° is drawn in with a solid line and the profile with a perpendicularly positioned detector 20 (angle of 0°) according to FIGS. 6 to 8 is drawn in with a dotted line.

It is clear to see that, from the measured signals of the inclined detector 26, for large distances such as e.g. 500 μm to 1000 μm a clear gradient and thus the direction of the position correction can be determined, whereas the signal of the detector 20 with positioning at 0° substantially only contains noise at these z values. The angle for the inclination of 50° given by way of example is not meant to be limitative. Other angle values are likewise possible. When the angle becomes larger, the effect becomes greater while with smaller angles the effect becomes smaller.

Figure 10:
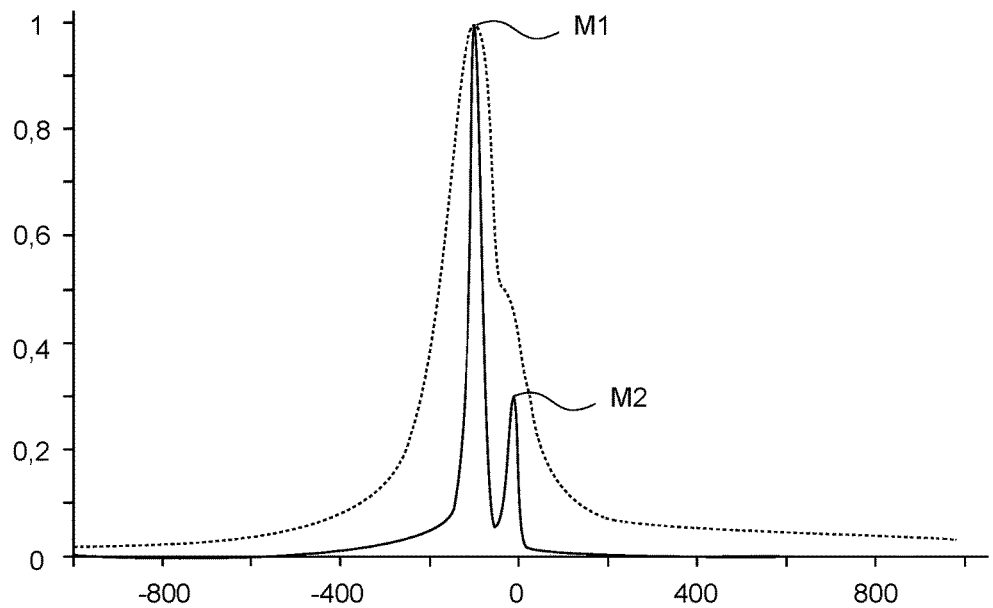
FIG. 10 is a representation according to FIG. 6 to explain the measurement with the inclined second detector according to FIG. 9.
Figure 11:
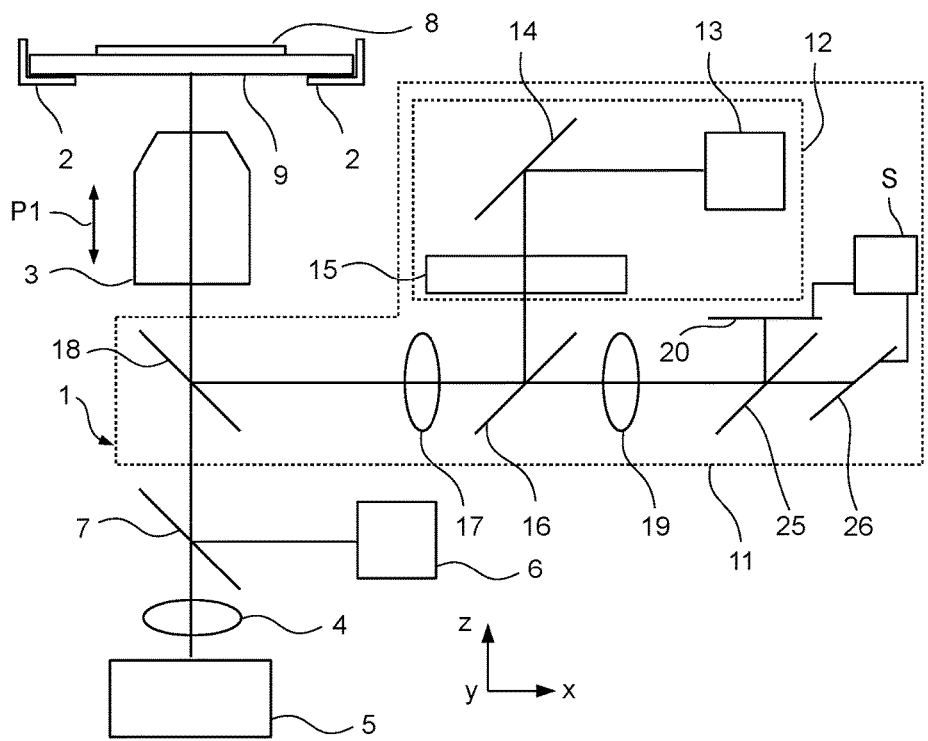
FIG. 11 is a schematic representation of a further embodiment of the microscope according to the invention.

Because of the reduced steepness at the focal position itself or the washiness of the second focus in the case of the inclined detector 26, as can be seen in FIG. 10, a second method is necessary for the target state to be determined reliably. This can be realized e.g. through two detectors 20, 26 in the detection unit 11, as is represented schematically in FIG. 11. For this, a beam splitter 25 is arranged in the detection unit 11 after the third partial optical system 19 such that measuring can take place simultaneously at 0° (detector 20) and at 50° (detector 26). The signals of the two detectors 20 and 26 can then be advantageously analyzed such that the signal of the detector 26 is analyzed for the direction determination in the case of a long distance from the cover glass 9 and the signal of the detector 20 is analyzed for the direction determination in the case of a short or shorter distance from the cover glass 9. Of course, it is also possible to provide only a single detector 20 and, for example, to tilt the latter. To determine the direction in the case of a long distance from the cover glass 9, the detector is inclined and to determine the direction in the case of a short or shorter distance it is then brought into the 0° position.

The detection unit 11 can also be further developed such that the direction is determined by means of the inclined detector and the precise position of the focal position is determined with another known method for focus determination.

Because of the measurement of only one single intensity at a z position it is necessary to approach several z positions in order to determine a direction for position correction. However, in the microscope 1 according to the invention it is possible to determine several z positions simultaneously in order thus to be able to infer directly from a single measurement the direction for position correction.

Figure 12:
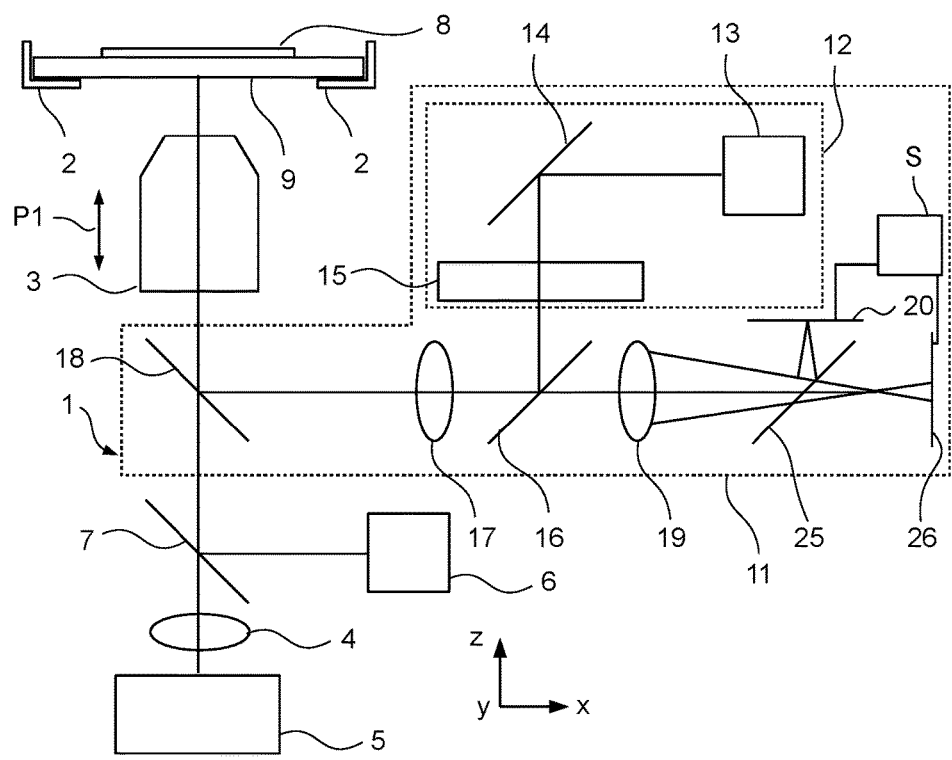
FIG. 12 is a schematic representation of a further embodiment of the microscope according to the invention.

Thus the detection unit 11 can e.g. be formed such that it contains at least two detectors 20, 26 on which the imaging takes place via a beam splitter 25. However, the two detectors 20 and 26 have a different distance along the imaging direction, as is indicated schematically in FIG. 12, such that with the two detectors 20 and 26 intensity values can be measured simultaneously at two different z values. Since measured values are present for two different z positions, which were captured with a single measurement, the direction can also be determined from a single measurement. Of course, more than two detectors 20, 26 can also be provided. With further beam splitters, further detectors can be positioned for different z values.

Figure 9:
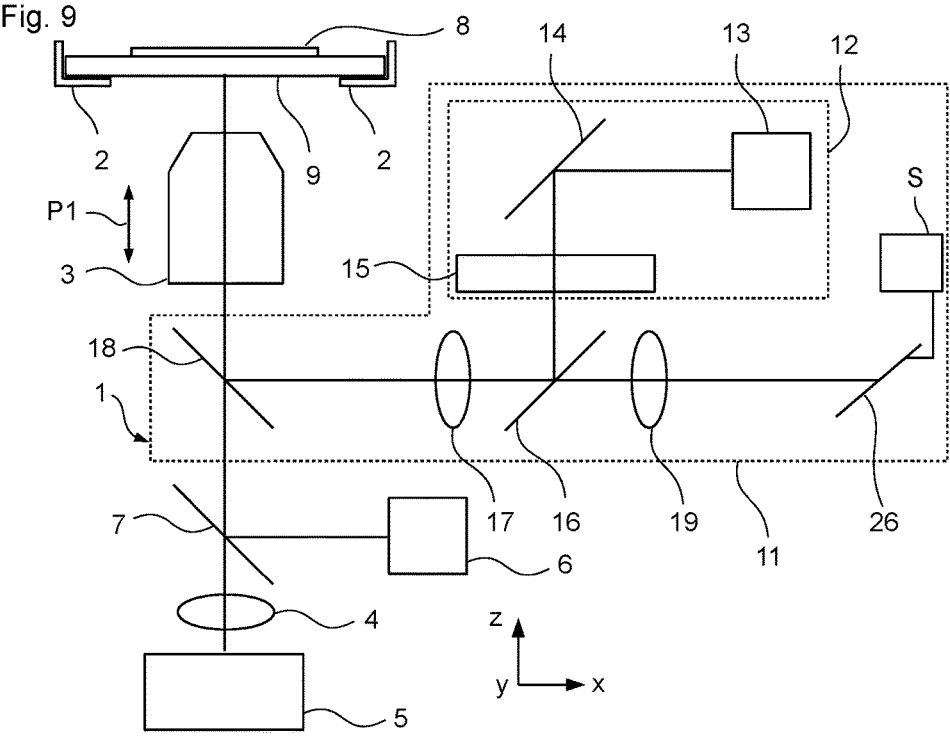
FIG. 9 is a schematic representation of a further embodiment of the microscope according to the invention.
Figure 13:
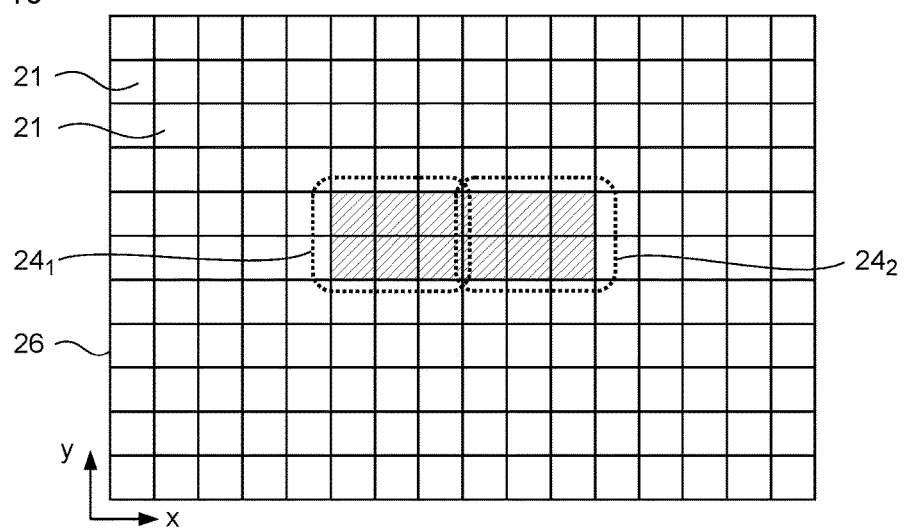
FIG. 13 is a schematic representation of the second detector, in which the analysis area is divided into two analysis areas, when the detector is inclined.

It is further possible, if the detector 26 in the detection unit 11 is inclined (as is shown in FIG. 9), to divide the analysis area 24 into two analysis areas $24_1$, $24_2$ and to analyze them separately, as is indicated in FIG. 13. Since information from several z positions is obtained simultaneously because of the inclination of the detector 26, the analysis area $24_1$ sees a different focal position from the analysis area $24_2$. Measured values from two different z areas are thus available and the direction can be inferred from them.

Figure 14:
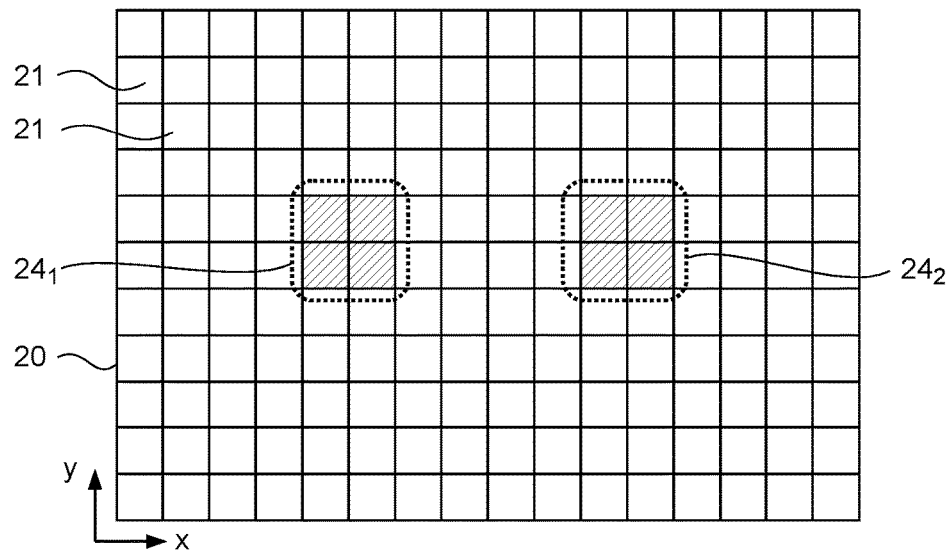
FIG. 14 is a schematic representation of the second detector to explain the definition of the analysis area for the case in which the illumination pattern comprises two partial patterns spaced apart from each other laterally with different focal positions.

Furthermore, it is possible to provide an illumination pattern which has e.g. two points (or partial patterns) which are spaced apart from each other laterally and which in each case are focused in different z positions in the object plane. The detector then also has two analysis areas $24_1$ and $24_2$, as is indicated in FIG. 14, which are spaced apart from each other laterally (that is in the plane of the detector 20). These two analysis areas $24_1$ and $24_2$ are assigned to different z positions. This means that when there is focusing in the analysis area $24_1$, the analysis area $24_2$ is imaged unfocused. Several intensity values from different z positions are thus obtained simultaneously from which the direction for position correction can be inferred. A possibility for realizing such an illumination consists in the use of a diffractive phase mask combined with an amplitude modulation. The amplitude modulation is not absolutely necessary and can also be omitted. Such phase masks are described in the publicly available thesis "Strahlformung in der Femtosekundenlaser-Mikrostrukturierung" [Beam formation in femtosecond laser microstructuring] from the Faculty of Mathematics and Physics at the Gottfried Wilhelm Leibniz University Hannover by Mr. Matthias Pospiech (http://edok01.tib.uni-hannover.de/edoks/e01dh11/664502180.pdf). Reference can be made in particular to pages 50 to 58.

With such a procedure, a single pattern can be multiplied by the diffractive phase mask in combination with the amplitude modulation and imaged in the area of the cover glass 9 such that the two partial patterns are present there with different focal positions.

As was already stated, in principle a focal position or the change in the direction of the focal position cannot be directly inferred from one intensity value. However, if one or more assumptions are met, the focal position can also be directly inferred from a single measurement. If, e.g., it is known whether the current focal position lies above or below the position of the target state, and a clear intensity value is present for the profile from above or below the position of the target state for each z position for a combination of lens 3 and cover glass 9, which is known, in this case the correction can be inferred from a single value. Thereby, it is possible to reach the target state from a single measurement and a one-off focus correction.

Even if it is not known whether the current focal position lies above or below the position of the target state, it is possible to determine from one measurement at two different z positions (e.g. by means of one of the possibilities already described), whether the current focal position lies above or below the position of the target state. This can be derived e.g. from the difference between the measured values. The necessary correction can then be determined together with the measured value of one of these measurements or a further measurement.

Since in the microscope 1 according to the invention the detector 20 is a separate detector and not the camera 5 of the microscope 1, the captures can be carried out independently of the locating of the target state by means of the detection unit 11. This leads to a gain in speed in the processing and image acquisition since parallel processing is possible.

As described, the detector 20 can be formed as a two-dimensional detector with several individually readable pixels 21. In particular it can be formed for example as a CCD detector. However, it is also possible to provide one or more light diodes as detector 20. In this case, the extent of the one or more light diodes themselves can realize the desired diaphragm effect or masking. It is further possible to arrange a corresponding mechanical diaphragm in front of the light diode or in front of the light diodes.

Figure 15:
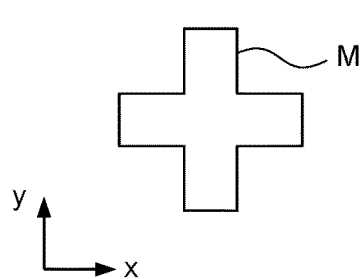
FIGS. 15 and 16 are further possible shapes of the predetermined illumination pattern.
Figure 16:
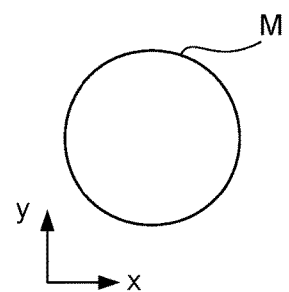

In the embodiments described hitherto, it was assumed that the pattern M is rectangular. However, any other shape of a pattern is possible. Thus, the pattern can, for example, be in the shape of a plus sign (FIG. 15) or circular (FIG. 16).

The light modulator 15 of the illuminating module 12 can, for example, be formed as an LCD module which comprises a plurality of selectively switchable pixels, with the result that thus light from only those areas which form the shape of the desired pattern is allowed to pass through. Other spatial light modulators, such as e.g. a tilting mirror matrix, can also be used as light modulator 15.

The microscope according to the invention can be formed as widefield microscope, as confocal microscope, as laser scanning microscope, as fluorescence microscope or as another microscope. In particular, the microscope according to the invention is formed as an automated microscope which carries out a desired microscopic examination automatically after the insertion of the sample 8. It is also possible for a supply unit to be provided which places several samples 8 provided in the supply unit into the holder 2 one after the other for microscopic examination.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A microscope, comprising:
  a holder configured to hold a sample carrier;
  an imaging unit, comprising a first detector and a first imaging optical system, the first imaging optical system configured to image at least one part of a sample held by the sample carrier along a first optical axis onto the first detector;
  a control unit; and
  a detection unit, comprising an illuminating module, a second detector and a second imaging optical system, wherein the illuminating module is configured to illuminate a sample carrier which is held by the holder with a predetermined pattern which is imaged by the second imaging optical system onto the second detector,
  wherein the second detector is masked such that a detection area of the second detector which the pattern occupies during focused imaging, or a part of the detection area, is defined as an analysis area, and
  wherein the control unit is configured to only analyze the measured values originating from the analysis area by the second detector in order to determine the direction of the change of position of the focus of the first imaging optical system along the first optical axis with the aim of positioning the boundary surface of the sample carrier directed towards the sample side in the depth of field area of the first imaging optical system.

2. The microscope according to claim 1, wherein the control unit is configured to control the illuminating module and the holder such that the predetermined pattern is imaged onto the second detector at two different focal positions of the second imaging optical system, and wherein the control unit is configured to determine on the basis of the measured values in which direction the focal position is to be shifted in order to position the boundary surface of the sample carrier directed towards the sample side in the depth of field area of the first imaging optical system.

3. The microscope according to claim 2, wherein the changes in the focal position of the first imaging optical system are chosen smaller to capture the predetermined pattern with the detection unit as the distance from the boundary surface of the sample carrier reduces.

4. The microscope according to claim 1, wherein the detection unit comprises at least two second detectors, the distance of which in the imaging direction from the holder is different such that the predetermined pattern can be captured simultaneously in different focal positions.

5. The microscope according to claim 1, wherein the illuminating module is configured such that the predetermined pattern, with which the sample carrier is illuminated, comprises two partial patterns at different focal positions which are spaced apart from each other laterally.

6. The microscope according to claim 1, wherein the second detector is configured as either a two-dimensional detector or a line detector which is aligned parallel to a plane in which the predetermined pattern is imaged.

7. The microscope according to claim 1, wherein the second detector is configured as either a two-dimensional detector or as a line detector which is arranged tilted with respect to a plane in which the predetermined pattern is imaged.

8. The microscope according to claim 7, wherein the analysis area is divided into a first and a second partial area in order to obtain measured values from different focal positions.

9. The microscope according to claim 1, wherein the illuminating module comprises two second detectors, wherein a first of the second detectors is tilted with respect to a plane in which the predetermined pattern is imaged and a second of the second detectors is arranged parallel to the plane in which the predetermined pattern is imaged.

10. The microscope according to claim 1, wherein the control unit is configured to determine, from the measured values at two different focal positions, whether the current focal position lies above or below a boundary surface of the sample carrier and determine a necessary correction along the first optical axis on the basis of this information in conjunction with a known intensity profile for above and below the boundary surface of the sample carrier, in order to position the boundary surface of the sample carrier directed towards the sample side in the depth of field area of the first imaging optical system.

11. The microscope according to claim 1, wherein the illuminating module is configured to multiply an illuminating pattern supplied to the illuminating module such that several partial patterns are generated.

12. The microscope according to claim 11, wherein the illuminating module is configured to direct the several partial patterns at the sample carrier such that the partial patterns are spaced apart from each other at least one of laterally and are imaged in different focal positions.

13. The microscope according to claim 11, wherein the illuminating module comprises a diffractive phase mask configured to multiply the supplied illuminating pattern.

14. The microscope according to claim 13, wherein the illuminating module comprises a module configured for amplitude modulation for multiplying the supplied illuminating pattern.

15. The microscope according to claim 1, wherein the thickness of the sample carrier is provided to the control unit and the control unit is configured to consider the thickness of the sample carrier when positioning the boundary surface of the sample carrier directed towards the sample side in the depth of field area of the first imaging optical system.

16. The microscope according to claim 1, wherein the microscope comprises an autofocus device configured to maintain the boundary surface of the sample carrier directed towards the sample side in the depth of field area of the first imaging optical system after positioning the boundary surface of the sample carrier directed towards the sample side in the depth of field area of the first imaging optical system.

17. The microscope according to claim 1, wherein the control unit is configured to control the illuminating module and the holder such that the predetermined pattern is imaged onto the second detector at two different focal positions of the second imaging optical system, wherein the focal positions are approached in succession in such a way that the distance to the sample carrier increases, and wherein the control unit is configured to determine based on the measured values in which direction the focal position is to be moved in order to position the boundary surface of the sample carrier directed towards the sample side in the depth of field area of the first imaging optical system.

18. The microscope according to claim 1, wherein the control unit is configured to control the illuminating module and the holder such that the predetermined pattern is imaged onto the second detector at two different focal positions of the second imaging optical system, and wherein a parabolic profile of the measurement values shows that the focal positions lie between both boundary surfaces of the sample carrier.

19. A microscopy method for a microscope comprising a first imaging optical system and a second imaging optical system, the method comprising:
   holding a sample with a sample carrier;
   imaging at least one part of a sample held by the sample carrier along a first optical axis onto a first detector of the first imaging optical system;
   illuminating the sample with a predetermined pattern onto a second detector of the second imaging optical system;
   masking the second detector such that a detection area of the second detector which the predetermined pattern occupies during focused imaging, or a part of the detection area, is defined as an analysis area;
   analyzing by the second detector only the measured values originating from the analysis area; and
   determining the direction of the change of position of the focus of the first imaging optical system along the first optical axis with the aim of positioning the boundary surface of the sample carrier directed towards the sample side in the depth of field area of the first imaging optical system.

* * * * *